(12) United States Patent
Yoshinobu et al.

(10) Patent No.: US 9,033,158 B2
(45) Date of Patent: May 19, 2015

(54) MOLDED ACTIVATED CHARCOAL AND WATER PURIFIER INVOLVING SAME

(75) Inventors: Hiroe Yoshinobu, Bizen (JP); Satoru Arita, Bizen (JP); Shuji Kawasaki, Bizen (JP)

(73) Assignee: KURARAY CHEMICAL CO., LTD., Bizen-shi (JP)

( * ) Notice: Subject to any disclaimer, the term of this patent is extended or adjusted under 35 U.S.C. 154(b) by 573 days.

(21) Appl. No.: 13/389,187

(22) PCT Filed: Aug. 6, 2010

(86) PCT No.: PCT/JP2010/063364
§ 371 (c)(1),
(2), (4) Date: Feb. 6, 2012

(87) PCT Pub. No.: WO2011/016548
PCT Pub. Date: Feb. 10, 2011

(65) Prior Publication Data
US 2012/0132578 A1    May 31, 2012

(30) Foreign Application Priority Data

Aug. 6, 2009    (JP) ................................. 2009-183411

(51) Int. Cl.
*C02F 1/28*        (2006.01)
*C01B 31/08*       (2006.01)
*B01J 20/10*       (2006.01)
*B01J 20/16*       (2006.01)
(Continued)

(52) U.S. Cl.
CPC .............. *C02F 1/283* (2013.01); *C01B 31/089* (2013.01); *C01P 2004/61* (2013.01); *C02F 2201/006* (2013.01); *B01J 20/10* (2013.01); *B01J 20/16* (2013.01); *B01J 20/20* (2013.01); *B01J 20/2803* (2013.01); *B01J 20/3007* (2013.01); *B01J 2220/42* (2013.01); *B01J 2220/62* (2013.01); *B01J 20/28004* (2013.01)

(58) Field of Classification Search
None
See application file for complete search history.

(56) References Cited

U.S. PATENT DOCUMENTS 4,929,502 A    5/1990  Giglia
5,928,588 A *  7/1999  Chen et al. .................... 264/113
(Continued)

FOREIGN PATENT DOCUMENTS

CN    1625429 A    6/2005
CN    1956919 A    5/2007
(Continued)

OTHER PUBLICATIONS

International Search Report issued on Oct. 26, 2010 in PCT/JP10/063364 filed on Aug. 6, 2010.
(Continued)

*Primary Examiner* — Benjamin Kurtz
(74) *Attorney, Agent, or Firm* — Oblon, McClelland, Maier & Neustadt, L.L.P.

(57) ABSTRACT

The present invention provides molded activated carbon, and the molded activated carbon is produced by molding a mixture containing powdery activated carbon (a) having a median particle size of 80 μm to 120 μm and a standard deviation σg of 1.3 to 1.9 in a particle size distribution and a fibrous binder (b). The molded activated carbon of the present invention has excellent removability for free residual chlorine, volatile organic compounds, CAT, and 2-MIB and excellent turbidity filterability, and is for use as a water purifier cartridge or the like.

19 Claims, 13 Drawing Sheets

(51) Int. Cl.
  *B01J 20/20* (2006.01)
  *B01J 20/28* (2006.01)
  *B01J 20/30* (2006.01)

(56) References Cited

U.S. PATENT DOCUMENTS

| 6,368,504 | B1 | 4/2002 | Kuennen et al. | |
|---|---|---|---|---|
| 2008/0063592 | A1 | 3/2008 | Nakahara et al. | |
| 2008/0105611 | A1* | 5/2008 | Collias et al. | 210/500.25 |

FOREIGN PATENT DOCUMENTS

| JP | 63-190100 A | 8/1988 |
|---|---|---|
| JP | 06-312133 A | 11/1994 |
| JP | 3042850 | 8/1997 |
| JP | 3042850 U | 8/1997 |
| JP | 2000-256999 | 9/2000 |
| JP | 2000-263040 | 9/2000 |
| JP | 2000 263040 | 9/2000 |
| JP | 2002-273417 A | 9/2002 |
| JP | 2003-010614 * | 1/2003 |
| JP | 2003-10614 | 1/2003 |
| JP | 2003 10614 | 1/2003 |
| JP | 2003-144821 | 5/2003 |
| JP | 2003 144821 | 5/2003 |
| JP | 3516811 B2 | 1/2004 |
| JP | 2004-513772 | 5/2004 |
| JP | 2005-013883 A | 1/2005 |
| JP | 2005-199219 | 7/2005 |
| JP | 2005 199219 | 7/2005 |
| JP | 2009-061352 A | 3/2009 |
| JP | 2009-530109 A | 8/2009 |
| WO | WO 03/064006 A1 | 8/2003 |
| WO | WO 2004/011136 A1 | 2/2004 |
| WO | WO 2004/011136 * | 5/2004 |
| WO | WO 2007/109774 A2 | 9/2007 |

OTHER PUBLICATIONS

Kuraray Chemical Co.., Ltd., "Kuraray Carbon Product Selection Recommendation" Aug. 1, 2009, Search on Dec. 11, 2014, 3 pages.
Kuraray Chemical Co., Ltd., Powdered Carbon specially suited for Carbon Block Production: PGW & PGWH, Mar. 2009, Search on Dec. 11, 2014, 1 page.

* cited by examiner

US 9,033,158 B2

MOLDED ACTIVATED CHARCOAL AND WATER PURIFIER INVOLVING SAME

TECHNICAL FIELD

The present invention relates to molded activated carbon and a water purifier that uses such molded activated carbon. More specifically, the present invention relates to molded activated carbon produced by molding a mixture of powdery activated carbon (a) having a specific median particle size and a specific standard deviation in a particle size distribution and a fibrous binder (b), and a water purifier that uses such molded activated carbon. Having excellent adsorptive removability for free residual chlorine, mold odors, and trihalomethanes in water as well as excellent turbidity filterability, the molded activated carbon of the present invention is processed into a water purifying filter, loaded into a housing, and suitably used as a water purifier.

BACKGROUND ART

Recently, safety and hygienic concerns have increased with regard to water quality, in particular, tap water, and removal of harmful substances contained in drinking water, such as free residual chlorine, trihalomethanes, and mold odors, is desired. Heretofore, for removal of such harmful substances, water purifiers in which a housing is filled with granular activated carbon have been mainly used.

Trihalomethane dissolved in tap water in a small amount is suspected to be a carcinogen. With increasing health consciousness of recent years, the importance of water purifiers that can remove trihalomethane is continuing to rise, and the present applicant previously filed a patent application on a water purifier having excellent trihalomethane removability (Patent Document 1)

PRIOR ART DOCUMENTS

Patent Documents

Patent Document 1: Japanese Patent Number 4064309
Patent Document 2: Japanese Patent Number 3516811

SUMMARY OF INVENTION

Problems to be Solved by the Invention

However, recently, in addition to water purifiers that have excellent removability for harmful substances such as free residual chlorine, trihalomethanes, and mold odors, water purifiers that also have excellent removability for turbidity components are sought. A water purifier filled with the molded activated carbon as a water purifying filter described in Patent Document 1 has excellent turbidity component removability, but the molded activated carbon integrally molded by a slurry suction method is in some cases further compressed on a workbench to neaten its shape, and the compressed surface portion sometimes results in impaired turbidity filterability.

Therefore, an object of the present invention is to provide molded activated carbon having excellent removability for free residual chlorine, volatile organic compounds, 2-chloro-4,6-bisethylamino-1,3,5-triazine (CAT), and 2-methyl isoborneol (2-MIB) as measured according to JIS S 3201 (2004) and having excellent turbidity filterability; a water purifying filter composed of the molded activated carbon; a cartridge filled with the molded activated carbon or the water purifying filter; and a water purifier that uses the cartridge.

Means for Solving the Problems

Having diligently made repeated examinations, the present inventors have found that the object can be achieved by molded activated carbon produced by molding a mixture containing powdery activated carbon having a specific median particle size and a specific standard deviation in a particle size distribution and a fibrous binder, and have reached the present invention.

The present invention provides molded activated carbon produced by molding a mixture comprising powdery activated carbon (a) having a median particle size of 80 μm to 120 μm and a standard deviation σg of 1.3 to 1.9 in a particle size distribution and a fibrous binder (b), the standard deviation σg being expressed as $D_{15.87}/D_{50}$, where $D_{15.87}$ is a value of a diameter at 15.87% in a volume-based cumulative fraction in the case where a volume integral is obtained from large particles of the powdery activated carbon in a volume-average particle size distribution, and $D_{50}$ is a value of a diameter at 50% in a volume-based cumulative fraction in the case where a volume integral is obtained from large particles of the powdery activated carbon in a volume-average particle size distribution.

In one embodiment, the mixture further comprises an amorphous titanosilicate-based inorganic compound or an aluminosilicate-based inorganic compound (c).

In one embodiment, the powdery activated carbon (a) has a standard deviation σp of 0.3 to 0.5 in the particle size distribution, and the standard deviation σp is expressed as $D_{84.13}/D_{50}$, where $D_{84.13}$ is a value of a diameter at 84.13% in a volume-based cumulative fraction in the case where a volume integral is obtained from large particles of the powdery activated carbon in a volume-average particle size distribution, and $D_{50}$ is a value of a diameter at 50% in a volume-based cumulative fraction in the case where a volume integral is obtained from large particles of the powdery activated carbon in a volume-average particle size distribution.

In an embodiment, the powdery activated carbon (a) has a benzene adsorption amount of 20 to 60 wt %.

In an embodiment, the mixture comprises the fibrous binder (b) in a proportion of 3 to 8 parts by weight relative to 100 parts by weight of the powdery activated carbon (a).

In another embodiment, the powdery activated carbon (a) is activated carbon powder of coconut shell or phenolic resin-based activated carbon powder.

In the other embodiment, activated carbon contained in the molded activated carbon is entirely the powdery activated carbon (a).

The present invention also provides a water purifying filter comprising the molded activated carbon.

The present invention provides a cartridge in which a housing is filled with the molded activated carbon or the water purifying filter.

The present invention further provides a water purifier loaded with the cartridge.

In one embodiment, the water purifier maintains a turbidity removal efficiency of no less than 80% and has a turbidity filterability of no less than 15 L per 1 mL of molded activated carbon or water purifying filter.

Effects of Invention

The present invention provides molded activated carbon having excellent removability for free residual chlorine, volatile organic compounds, CAT, and 2-MIB as measured according to JIS S 3201 (2004) and excellent turbidity filterability. The molded activated carbon of the present invention can be fabricated into a cartridge by filling a housing with the molded activated carbon as-is or after processing the molded activated carbon into a water purifying filter. This cartridge can be suitably used after being loaded into a water purifier. Moreover, use of the molded activated carbon of the present invention obviates a hollow fiber membrane cartridge that is conventionally used for turbidity removal together with activated carbon, and therefore it is also advantageous because a water purifier is readily assembled and a compact water purifier is achieved.

MODE FOR CARRYING OUT THE INVENTION

Figure 1:
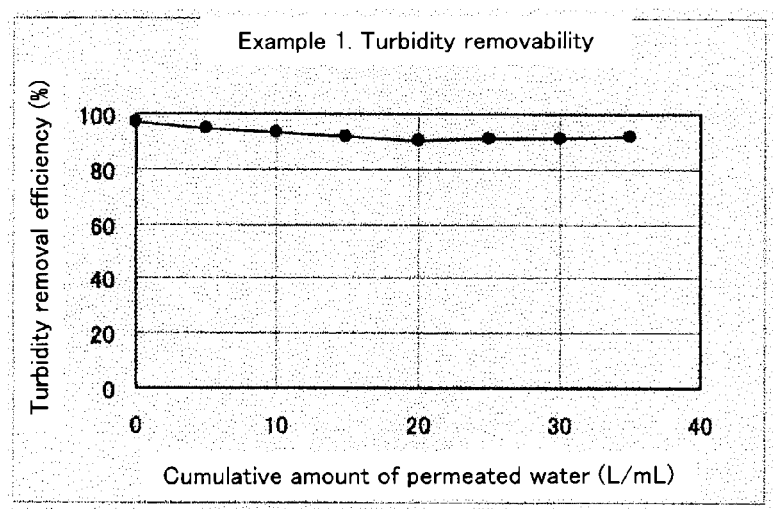
FIG. 1 is a graph showing the turbidity removability of the water purifier of Example 1.

The most significant feature of the present invention is obtaining a molded article using powdery activated carbon having a specific median particle size and having a specific standard deviation in a particle size distribution. With molded activated carbon produced by molding a mixture containing such powdery activated carbon (a) and a fibrous binder (b), a water purifier having excellent removability for free residual chlorine, volatile organic compounds, CAT, and 2-MIB as measured according to JIS S 3201 (2004) and excellent turbidity filterability can be obtained.

The powdery activated carbon used in the present invention is activated carbon pulverized or granulated according to any method. Coconut shell, coal, wood, synthetic resin, and those that turn into activated carbon by activation can be used as raw materials of the powdery activated carbon. Among such raw materials, coconut shell-based activated carbon or phenolic resin-based raw materials are preferable. Such raw materials usually contain little impurities and retain good adsorptivity even in a powdery form.

In the present invention, powdery activated carbon having a median particle size of 80 μm to 120 μm and a standard deviation σg of 1.3 to 1.9 in a particle size distribution is used. When the median particle size is less than 80 μm, water flow resistance may be increased, clogging caused by turbidity components may be accelerated, or fine particles may enter the treated water. When the median particle size exceeds 120 μm, removal of turbidity components when water flows may be insufficient, or the performance may be poor due to low contact efficiency.

The median particle size is a value measured by a laser diffraction/scattering method and refers to a diameter value of a particle whose volume-based cumulative fraction is 50% ($D_{50}$) when a volume integral is obtained in descending order in a volume particle size distribution. Likewise, $D_{15.87}$ represents a diameter value of a particle whose volume-based cumulative fraction is 15.87%, and $D_{84.13}$ represents a diameter value of a particle whose volume-based cumulative fraction is 84.13%. Measurement by a laser diffraction/scattering method is performed with, for example, a Microtrac particle size analyzer (MT3300) manufactured by Nikkiso Co., Ltd., or the like.

The standard deviation σg is expressed as $D_{15.87}/D_{50}$. The standard deviation σg in the particle size distribution of the powdery activated carbon used in the present invention is 1.3 to 1.9. When the value of the standard deviation σg is less than 1.3, voids are few, and clogging is accelerated. When the value of the standard deviation σg is greater than 1.9, voids are increased, and turbidity removability is poor.

Moreover, the standard deviation σp is expressed as $D_{84.13}/D_{50}$. The standard deviation σp in the particle size distribution of the powdery activated carbon used in the present invention is preferably 0.3 to 0.5, more preferably 0.33 to 0.48, and even more preferably 0.36 to 0.45. When the value of the standard deviation σp is less than 0.3, voids are few, and clogging is likely to be accelerated. When the value of the standard deviation σp is greater than 0.5, voids are increased, and turbidity removability is likely to be poor.

In the present invention, powdery activated carbon having a standard deviation σg of 1.3 to 1.9 and a standard deviation σp of 0.3 to 0.5 in a particle size distribution is preferably used.

When the adsorption capacity is excessively small, it cannot be said that the powdery activated carbon possesses sufficient adsorbability, and when the adsorption capacity is excessive, the powdery activated carbon is in a excessively activated state and has an increased pore size, and the trihalomethane adsorptive retentivity tends to be poor. Therefore, the adsorption capacity of the powdery activated carbon is preferably 20 to 60 wt % in terms of the benzene adsorption amount prescribed in JIS-K1474, more preferably 20 to 55 wt %, even more preferably 20 to 50 wt %, and most preferably 25 to 40 wt %.

In the present invention, as long as the aforementioned median particle size and standard deviations are satisfied, two or more different kinds of powdery activated carbon may be contained. That is, a final mixture obtained by mixing two or more different kinds of powdery activated carbon is usable if the aforementioned median particle size and standard deviations are satisfied.

The fibrous binder used in the present invention is not particularly limited as long as the fibrous binder, once fibrillated, can impart a shape by entangling itself with activated carbon fiber and powdery activated carbon, and a broad spectrum of products can be used irrespective of being synthetic or natural. Examples of such fibrous binders include acrylic fibers, polyethylene fibers, polypropylene fibers, polyacrylonitrile fibers, cellulose fibers, nylon fibers, aramid fibers, and the like. The fiber length of the fibrous binder is preferably 4 mm or less.

Production of the molded activated carbon of the present invention is performed according to any method, and not particularly limited. A slurry suction method is preferable for enabling efficient production. In the case where a slurry suction method is used, for example, as described in Japanese Patent No. 3516811 (Patent Literature 2), a double-pipe container furnished with a large number of suction pores is provided, and by sucking slurry from the central part, a cylindrical molded article can be produced.

For example, the outer pipe of a water-permeable double-pipe container is prepared with a 200-mesh stainless steel wire mesh, and the inner pipe of a double-pipe container is prepared with the same wire mesh as the outer pipe, and the inner pipe is inserted into the outer pipe, thus giving a double-pipe container. By filling slurry between the inner pipe and the outer pipe of the double-pipe container, the molded activated carbon of the present invention can be produced.

By dispersing powdery activated carbon and a fibrous binder in water such that the solids concentration is 5 to 15 wt %, slurry is prepared. From the viewpoint of adsorption effect for free residual chlorine and like substances, moldability, and the like, preferably, the fibrous binder is contained in a proportion of preferably 3 to 8 parts by weight and more preferably 3.5 to 6 parts by weight relative to 100 parts by weight of the powdery activated carbon.

It is preferable that the molded activated carbon of the present invention further contains an amorphous titanosilicate-based inorganic compound or an aluminosilicate-based inorganic compound. When either compound is contained, soluble lead may be removed. As an amorphous titanosilicate-based inorganic compound, amorphous titanosilicate marketed under the trade name ATS from BASF is effectively used, and in the case where an aluminosilicate-based inorganic compound is to be used, A or X-type zeolite is preferably used because of its large ion exchange capacity. Either compound is preferably contained in a proportion of 2 to 20 parts by weight and more preferably 3 to 10 parts by weight relative to 100 parts by weight of powdery activated carbon.

In the present invention, although it is preferable that the activated carbon contained is entirely the above-described powdery activated carbon, activated carbon fiber may be contained. It is preferable that the activated carbon fiber is activated carbon having a specific surface area of about 1000 to 1800 $m^2/g$ that is produced by carbonizing a pitch-based, phenol-based, cellulose-based, or like fiber and then activating the fiber with steam, gas, or a chemical. For example, a method is cited in which a raw material fiber such as a phenolic resin-based fiber is treated with steam and/or carbon dioxide gas in a nitrogen stream or activation-treated with combustion gas at a high temperature of about 600 to 1400° C. Such activated carbon fiber is preferably contained in a proportion of 0.1 to 20 parts by weight and more preferably 1 to 5 parts by weight relative to 100 parts by weight of powdery activated carbon.

The molded activated carbon of the present invention may contain components other than those described above as long as the effects of the present invention are not impaired. Examples of such components include adsorbents containing silver ions and/or a silver compound to impart antibacterial properties, adsorbents containing copper ions and/or a copper compound, titanium dioxide, silicon dioxide, hydroxyapatite, bone black, ion exchange resin, and the like. The amounts of such components contained are not particularly limited.

The molded activated carbon of the present invention is used as, for example, a water purifying filter or the like. The water purifying filter of the present invention can be obtained by, for example, producing the molded activated carbon of the present invention according to the above-described production method, and then neatening and drying the activated carbon, and then cutting the activated carbon into the desired size and shape. The molded activated carbon may be compressed on a workbench to neaten the shape of the molded activated carbon, but compression should be minimal since excessive compression may result in consolidation of the surface of the molded activated carbon. In the case where the molded activated carbon of the present invention is used as a water purifying filter for a water purifier, it is preferable that the filter is in a cylindrical shape, and furthermore, the top portion of the cylindrical shape may be furnished with a cap, or the surface may be furnished with nonwoven fabric, as necessary. By processing the filter into a cylindrical shape, water flow resistance can be lowered, and furthermore, in the case where the filter is used as a cartridge by filling a housing therewith, cartridge loading/replacement for a water purifier can be readily performed.

The water purifying filter of the present invention can be used as a cartridge by filling a housing therewith. The molded activated carbon of the present invention may be used as a cartridge by filling a housing with the molded activated carbon as is. The cartridge is loaded into a water purifier, and water flows therethrough. As a water flow system, total filtration in which the entire amount of raw water is filtered or recirculation filtration is adopted. For example, a housing is filled with the water purifying filter so as to be used a cartridge that will be loaded into the water purifier of the present invention. Furthermore, the cartridge can be used in combination with known nonwoven fabric filters, various adsorbents, mineral additives, ceramic filtering materials, and the like.

The concentrations of free residual chlorine, trihalomethanes, and the like in raw water and permeated water as well as the removability for such substances can be measured according to JIS S 3201 (2004), and the turbidity filterability can also be measured according to the JIS.

Conditions under which water flows into the water purifier are not particularly limited, and water flows at a space velocity (SV) of 100 to 5000 $hr^{-1}$ such that the pressure drop is not excessively increased, and regarding turbidity filterability, water processed to have a turbidity of 2.0±0.2 degrees using test kaolin flows while maintaining a dynamic water pressure of 0.1 MPa, and the relation between the turbidity removal efficiency obtained by dividing the turbidity of permeated water by the turbidity of raw water and the ratio of the amount of water (L) that has flowed since the beginning of water flow to the volume (mL) of the molded activated carbon or the water purifying filter (cumulative amount of permeated water L/mL) is plotted as well as the relation between the filtration flow rate and the cumulative amount of permeated water is plotted, and thereby the performance of the water purifier can be verified.

In the present invention, water flows according to the method for testing a household water purifier prescribed in JIS S 3201 (2004), and the point at which the turbidity removal efficiency falls below 80% is regarded as the removal efficiency breakthrough point, and the point at which the filtration flow rate falls below ½ of the initial flow rate is regarded as the clogging breakthrough point. Turbidity filterability can be indicated by removal efficiency breakthrough or clogging breakthrough, whichever is sooner. When the molded activated carbon of the present invention is used as a water purifying material, since the adsorption rate is high, the performance thereof is sufficiently demonstrated even at a flow rate exceeding an SV of 1000 $hr^{-1}$, and therefore the size of a container can be greatly reduced.

In the water purifier, it is preferable that the turbidity removal efficiency is no less than 80% and the turbidity filterability that means an ability to maintain a filtration flow rate of no less than ½ of the initial flow rate at 0.1 MPa is no less than 15 L per 1 mL of the molded activated carbon or the water purifying filter. In the case where a mixture to which an amorphous titanosilicate-based inorganic compound or an aluminosilicate-based inorganic compound is added is molded, the molded article also exhibits excellent soluble lead removability, and it is preferable that the lead removal efficiency is no less than 80% and the lead filterability is no less than 15 L per 1 mL of the molded activated carbon or the water purifying filter. Hereinbelow, the present invention will be described in detail by way of examples, but the present invention is not limited to the examples.

EXAMPLES

Example 1

Slurry was prepared by dispersing in water 90 parts by weight of PGW-100MD (made from coconut shell, median particle size of 100 μm, standard deviation σg of 1.6, standard deviation σp of 0.40, benzene adsorption amount of 33 wt %) manufactured by Kuraray Chemical Co., Ltd., as powdery activated carbon, 5 parts by weight of a titanosilicate-based lead remover ATS (mean particle size of 20 μm) manufactured by BASF as a lead adsorbent, and 5 parts by weight of an acrylic fiber Bi-PUL/F manufactured by Japan Exlan Co., Ltd., as a fibrous binder. Next, the resulting slurry was filled into a double-pipe container having an outer diameter of 42 mm, an inner diameter of 14 mm, and a height of 83 mm provided with a large number of pores each having a diameter of 3 mm, and sucked at 350 mmHg, and no compression was performed thereafter, thus giving molded activated carbon in a hollow cylindrical shape having an outer diameter of 42.5 mm, an inner diameter of 14 mm, and a height of 83 mm.

This molded article was loaded into a transparent plastic housing having a diameter of 45 mm, a length of 83 mm, and an inner space volume of 132 mL, and water flowed at 2 L/min at an SV of 1100 $Hr^{-1}$ according to the test method for a household water purifier prescribed in JIS S 3201 (2004) to carry out a filterability test for free residual chlorine, volatile organic compounds, CAT, 2-MIB, and soluble lead. With the time point at which the removal efficiency was 80% being regarded as the breakthrough point of the water purifier, the removability per 1 mL of the molded article was investigated. The results are shown in Table 1.

TABLE 1

Example 1 Filterability test

| | Substance to be removed | Breakthrough point (L) | Filterability (L/mL) |
|---|---|---|---|
| 1 | Free residual chlorine | 25,000 | 238 |
| 2 | Turbidity | 3,100 | 30 |
| 3 | Chloroform | 1,800 | 17 |
| 4 | Bromodichloromethane | 5,200 | 50 |
| 5 | Dibromochloromethane | 7,200 | 69 |
| 6 | Bromoform | 28,000 | 267 |
| 7 | Tetrachloroethylene | 49,000 | 467 |
| 8 | Trichloroethylene | 16,000 | 153 |
| 9 | 1,1,1-Trichloroethane | 3,000 | 29 |
| 10 | Total trihalomethanes | 2,200 | 21 |
| 11 | CAT | 25,000 | 238 |
| 12 | 2-MIB | 27,000 | 257 |
| 13 | Soluble lead | 5,200 | 50 |

Figure 2:
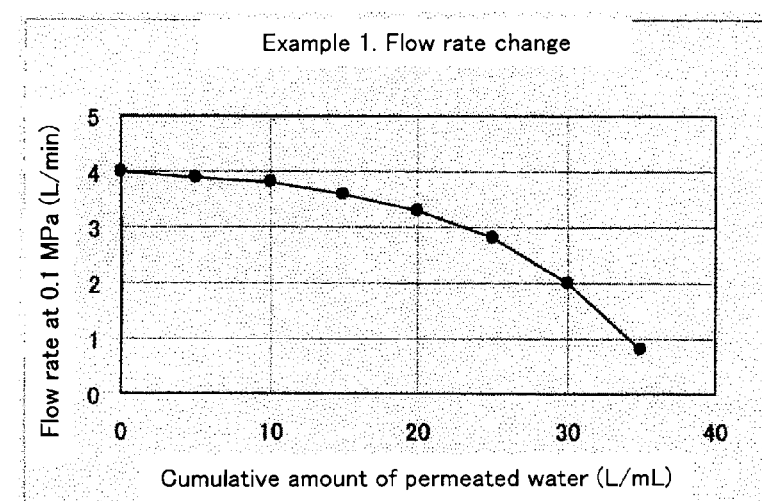
FIG. 2 is a graph showing the change in the amount of turbid water that flows through the water purifier of Example 1.

When test kaolin was added such that the turbidity was 2.0±0.2 degrees and water flowed from outside to inside at 20° C. at 0.1 MPa, the flow rate after the first 10 minutes was 4 L/min. The results are shown in Table 9 and FIGS. 1 and 2. As shown in FIG. 1, a turbidity removal efficiency of no less than 80% was maintained, and as shown in FIG. 2, the turbidity filterability at the point where the flow rate fell below 2 L/min, which was ½ of the initial flow rate, was 30 L/mL.

Example 2

Molded activated carbon in a hollow cylindrical shape was obtained by suction molding in the same manner as in Example 1 except that PGW-120MP (made from coconut shell, median particle size of 120 μm, standard deviation σg of 1.7, standard deviation σp of 0.47, benzene adsorption amount of 33 wt %) manufactured by Kuraray Chemical Co., Ltd., was used as powdery activated carbon in place of PGW-100MD. A filterability test for free residual chlorine, volatile organic compounds, CAT, 2-MIB, and soluble lead was carried out in the same manner as in Example 1, and showed excellent results (Table 2).

TABLE 2

Example 2 Filterability test

| | Substance to be removed | Breakthrough point (L) | Filterability (L/mL) |
|---|---|---|---|
| 1 | Free residual chlorine | 21,000 | 200 |
| 2 | Turbidity | 1,700 | 16 |
| 3 | Chloroform | 1,500 | 14 |
| 4 | Bromodichloromethane | 4,400 | 42 |
| 5 | Dibromochloromethane | 6,100 | 58 |
| 6 | Bromoform | 24,000 | 229 |
| 7 | Tetrachloroethylene | 42,000 | 400 |
| 8 | Trichloroethylene | 14,000 | 133 |
| 9 | 1,1,1-Trichloroethane | 2,600 | 25 |
| 10 | Total trihalomethanes | 1,900 | 18 |
| 11 | CAT | 21,000 | 200 |
| 12 | 2-MIB | 23,000 | 219 |
| 13 | Soluble lead | 4,400 | 42 |

Figure 3:
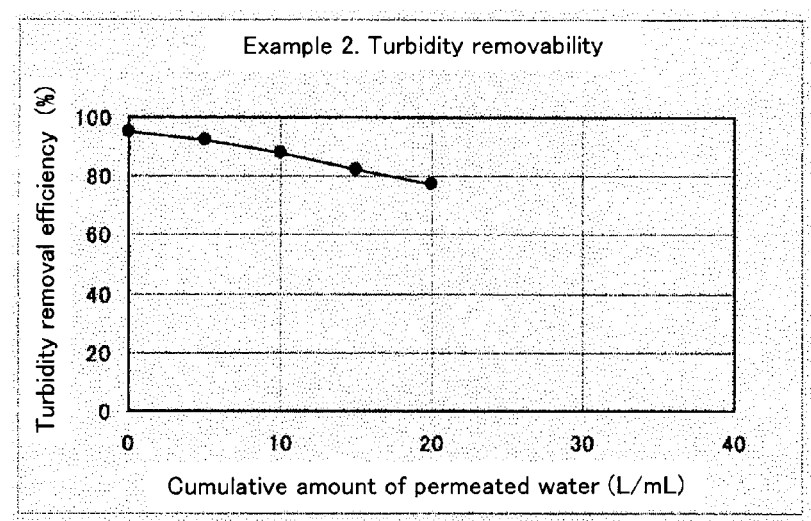
FIG. 3 is a graph showing the turbidity removability of the water purifier of Example 2.
Figure 4:
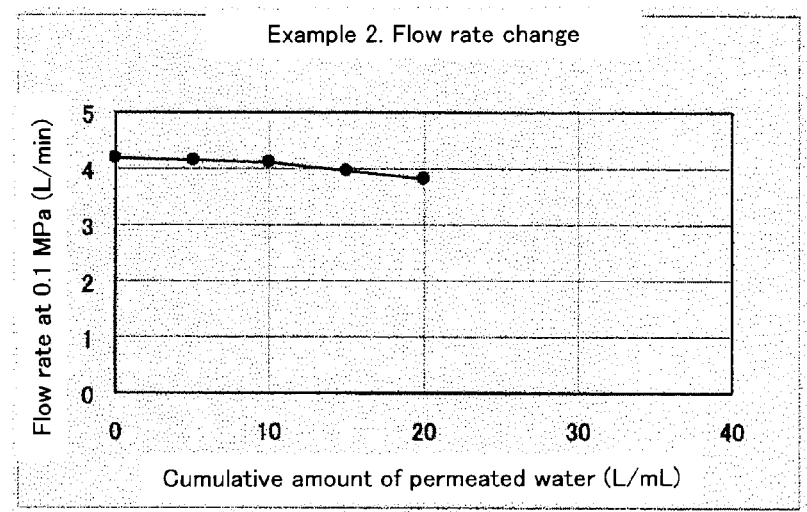
FIG. 4 is a graph showing the change in the amount of turbid water that flows through the water purifier of Example 2.

The results of measuring turbidity filterability in the same manner as in Example 1 are shown in Table 9 and FIGS. 3 and 4. Although there was little flow rate reduction as shown in FIG. 4, the turbidity removal efficiency fell below 80% at 16 L/mL, and the turbidity filterability was 16 L/mL as shown in FIG. 3.

Example 3

Molded activated carbon in a hollow cylindrical shape was obtained by suction molding in the same manner as in Example 1 except that 60 parts by weight of PGW-100MD and 30 parts by weight of PGW-20MD (made from coconut shell, median particle size of 40 μm, standard deviation σg of 2.0, benzene adsorption amount of 33 wt %) manufactured by Kuraray Chemical Co., Ltd., were used as powdery activated carbon. The median particle size of the mixed powdery activated carbon was 80 μm, the standard deviation σg was 1.8, and the standard deviation σp was 0.33. A filterability test for free residual chlorine, volatile organic compounds, CAT, 2-MIB, and soluble lead was carried out in the same manner as in Example 1, and showed excellent results (Table 3).

TABLE 3

Example 3 Filterability test

| | Substance to be removed | Breakthrough point (L) | Filterability (L/mL) |
|---|---|---|---|
| 1 | Free residual chlorine | 28,000 | 267 |
| 2 | Turbidity | 1,600 | 15 |
| 3 | Chloroform | 2,000 | 19 |
| 4 | Bromodichloromethane | 5,700 | 54 |
| 5 | Dibromochloromethane | 7,900 | 75 |
| 6 | Bromoform | 31,000 | 296 |
| 7 | Tetrachloroethylene | 54,000 | 515 |
| 8 | Trichloroethylene | 18,000 | 172 |
| 9 | 1,1,1-Trichloroethane | 3,300 | 31 |
| 10 | Total trihalomethanes | 2,400 | 23 |
| 11 | CAT | 28,000 | 267 |
| 12 | 2-MIB | 30,000 | 286 |
| 13 | Soluble lead | 5,700 | 54 |

Figure 5:
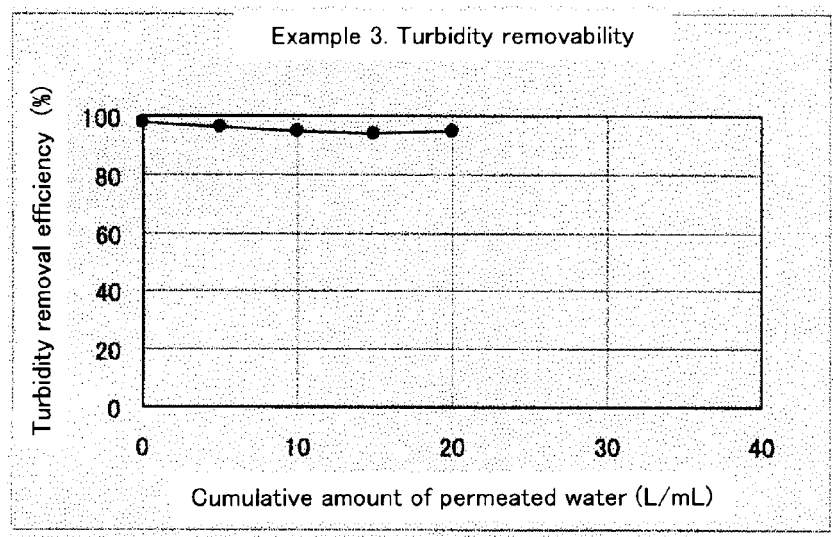
FIG. 5 is a graph showing the turbidity removability of the water purifier of Example 3.
Figure 6:
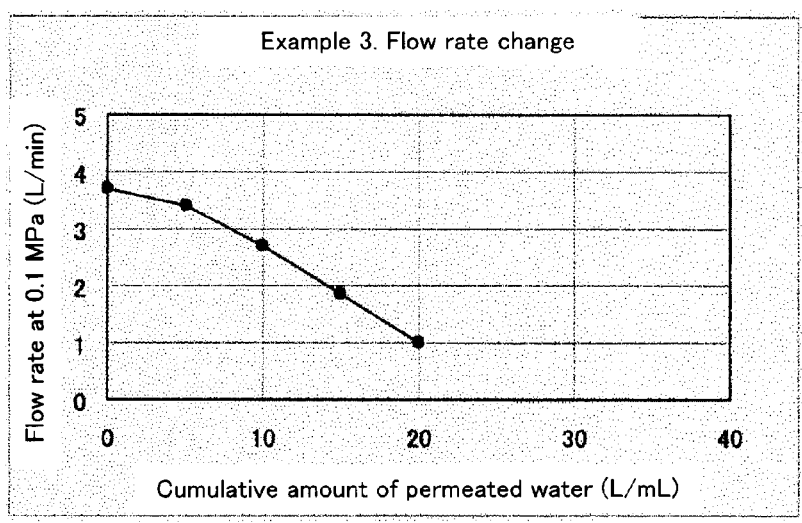
FIG. 6 is a graph showing the change in the amount of turbid water that flows through the water purifier of Example 3.

The results of measuring turbidity filterability in the same manner as in Example 1 are shown in Table 9 and FIGS. 5 and 6. As shown in FIG. 5, a turbidity removal efficiency of no less than 80% was maintained, and as shown in FIG. 6, the turbidity filterability at the point where the flow rate fell below ½ of the initial flow rate was 15 L/mL.

Example 4

Molded activated carbon in a hollow cylindrical shape was obtained by suction molding in the same manner as in Example 1 except that 87 parts by weight of PGW-100MD was used as powdery activated carbon and 8 parts by weight of Bi-PUL/F was used as a fibrous binder. A filterability test for free residual chlorine, volatile organic compounds, CAT, 2-MIB, and soluble lead was carried out in the same manner as in Example 1, and showed excellent results (Table 4).

TABLE 4

Example 4 Filterability test

| | Substance to be removed | Breakthrough point (L) | Filterability (L/mL) |
|---|---|---|---|
| 1 | Free residual chlorine | 23,000 | 219 |
| 2 | Turbidity | 2,100 | 20 |
| 3 | Chloroform | 1,600 | 15 |
| 4 | Bromodichloromethane | 4,700 | 45 |
| 5 | Dibromochloromethane | 6,500 | 62 |
| 6 | Bromoform | 25,000 | 238 |
| 7 | Tetrachloroethylene | 44,000 | 419 |
| 8 | Trichloroethylene | 14,000 | 133 |
| 9 | 1,1,1-Trichloroethane | 2,700 | 26 |
| 10 | Total trihalomethanes | 2,000 | 19 |
| 11 | CAT | 23,000 | 219 |
| 12 | 2-MIB | 24,000 | 229 |
| 13 | Soluble lead | 4,700 | 45 |

Figure 7:
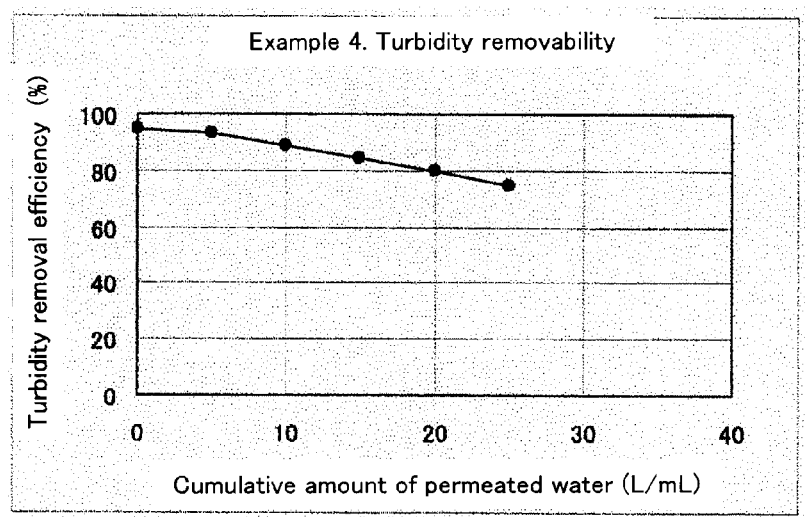
FIG. 7 is a graph showing the turbidity removability of the water purifier of Example 4.
Figure 8:
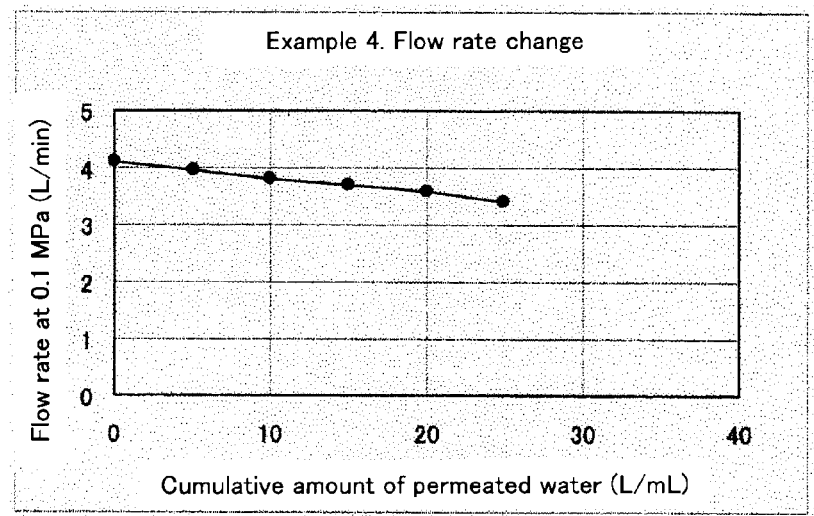
FIG. 8 is a graph showing the change in the amount of turbid water that flows through the water purifier of Example 4.

The results of measuring turbidity filterability in the same manner as in Example 1 are shown in Table 9 and FIGS. 7 and 8. Although a flow rate reduction was small as shown in FIG. 8, the turbidity removal efficiency fell below 80% at 20 L/mL, and the turbidity filterability was 20 L/mL as shown in FIG. 7.

Example 5

Molded activated carbon in a hollow cylindrical shape was obtained by suction molding in the same manner as in Example 1 except that 92 parts by weight of PGW-100MD was used as powdery activated carbon and 3 parts by weight of Bi-PUL/F was used as a fibrous binder. A filterability test for free residual chlorine, volatile organic compounds, CAT, 2-MIB, and soluble lead was carried out in the same manner as in Example 1, and showed excellent results (Table 5).

TABLE 5

Example 5 Filterability test

| | Substance to be removed | Breakthrough point (L) | Filterability (L/mL) |
|---|---|---|---|
| 1 | Free residual chlorine | 26,000 | 248 |
| 2 | Turbidity | 2,100 | 20 |
| 3 | Chloroform | 1,900 | 18 |
| 4 | Bromodichloromethane | 5,500 | 52 |
| 5 | Dibromochloromethane | 7,600 | 72 |
| 6 | Bromoform | 29,000 | 276 |
| 7 | Tetrachloroethylene | 51,000 | 486 |
| 8 | Trichloroethylene | 17,000 | 162 |
| 9 | 1,1,1-Trichloroethane | 3,200 | 31 |
| 10 | Total trihalomethanes | 2,300 | 22 |
| 11 | CAT | 26,000 | 248 |
| 12 | 2-MIB | 28,000 | 267 |
| 13 | Soluble lead | 5,500 | 52 |

Figure 9:
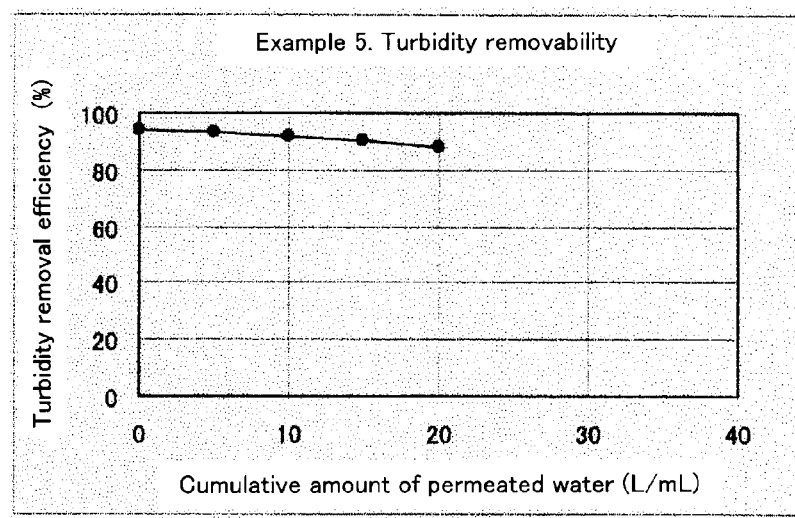
FIG. 9 is a graph showing the turbidity removability of the water purifier of Example 5.
Figure 10:
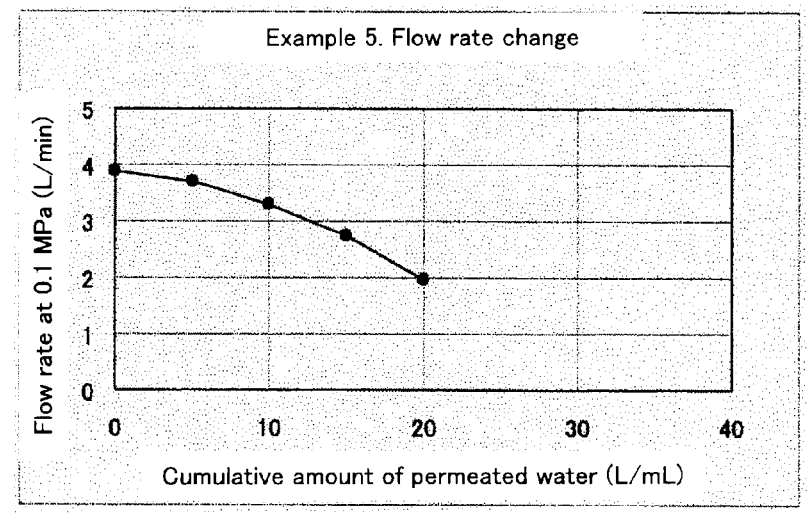
FIG. 10 is a graph showing the change in the amount of turbid water that flows through the water purifier of Example 5.

The results of measuring turbidity filterability in the same manner as in Example 1 are shown in Table 9 and FIGS. 9 and 10. As shown in FIG. 9, a turbidity removal efficiency of no less than 80% was maintained, and as shown in FIG. 10, the turbidity filterability at the point where the flow rate fell below ½ of the initial flow rate was 20 L/mL.

Example 6

Slurry was prepared by dispersing in water 95 parts by weight of PGWHH-120MP (made from coconut shell, median particle size of 120 μm, standard deviation σg of 1.7, standard deviation σp of 0.48, benzene adsorption amount of 50 wt %) manufactured by Kuraray Chemical Co., Ltd., as powdery activated carbon, and 5 parts by weight of Bi-PUL/F as a fibrous binder. The resulting slurry was suction-molded in the same manner as in Example 1, thus giving molded activated carbon in a hollow cylindrical shape. A filterability test for free residual chlorine, volatile organic compounds, CAT, and 2-MIB was carried out in the same manner as in Example 1, and showed excellent results (Table 6).

TABLE 6

Example 6 Filterability test

| | Substance to be removed | Breakthrough point (L) | Filterability (L/mL) |
|---|---|---|---|
| 1 | Free residual chlorine | 29,000 | 276 |
| 2 | Turbidity | 1,900 | 18 |
| 3 | Chloroform | 900 | 9 |
| 4 | Bromodichloromethane | 2,600 | 25 |
| 5 | Dibromochloromethane | 3,600 | 34 |
| 6 | Bromoform | 14,000 | 133 |
| 7 | Tetrachloroethylene | 25,000 | 238 |
| 8 | Trichloroethylene | 8,000 | 76 |
| 9 | 1,1,1-Trichloroethane | 1,500 | 14 |
| 10 | Total trihalomethanes | 1,100 | 10 |
| 11 | CAT | 29,000 | 276 |
| 12 | 2-MIB | 31,000 | 296 |

Figure 11:
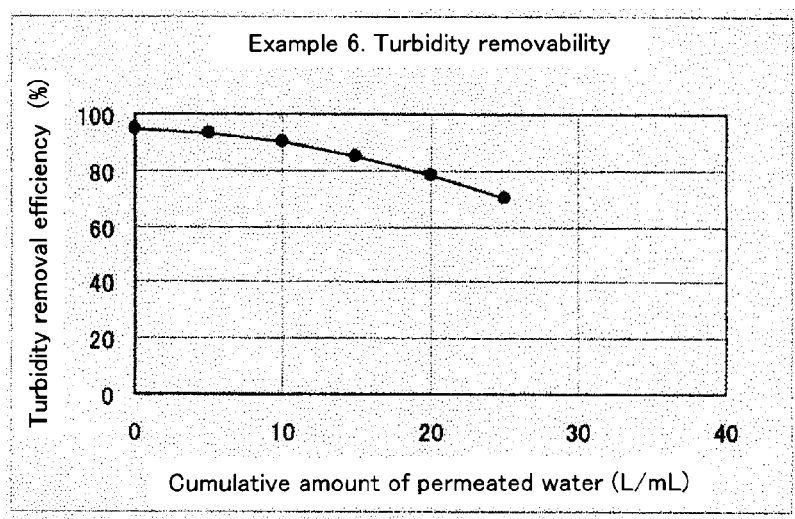
FIG. 11 is a graph showing the turbidity removability of the water purifier of Example 6.
Figure 12:
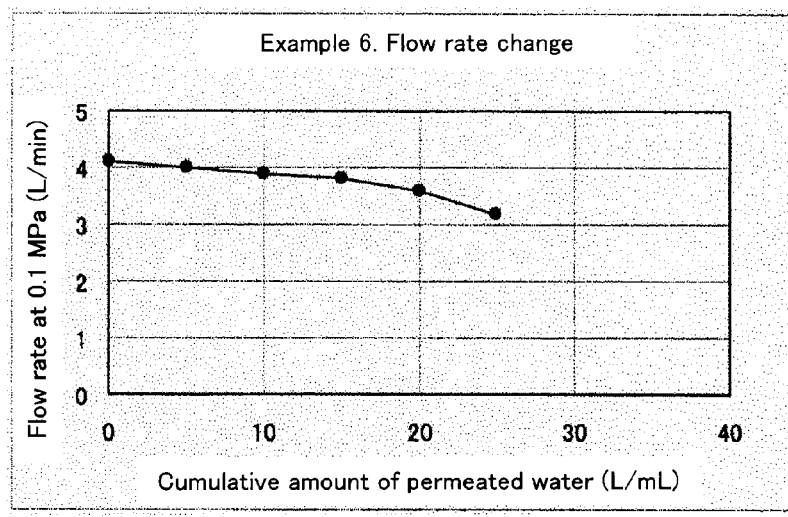
FIG. 12 is a graph showing the change in the amount of turbid water that flows through the water purifier of Example 6.

The results of measuring turbidity filterability in the same manner as in Example 1 are shown in Table 9 and FIGS. 11 and 12. Although a flow rate reduction was small as shown in FIG. 12, the turbidity removal efficiency fell below 80% at 18 L/mL, and the turbidity filterability was 18 L/mL as shown in FIG. 11.

Example 7

Slurry was prepared by dispersing in water 90 parts by weight of PGW-100MD as powdery activated carbon, 5 parts by weight of FR-15 (benzene adsorption amount of 45 wt %) manufactured by Kuraray Chemical Co., Ltd., chopped into 3 mm pieces as activated carbon fiber, and 5 parts by weight of Bi-PUL/F as a fibrous binder. The resulting slurry was suction-molded in the same manner as in Example 1, thus giving molded activated carbon in a hollow cylindrical shape. A filterability test for free residual chlorine, volatile organic compounds, CAT, and 2-MIB was carried out in the same manner as in Example 1, and showed excellent results (Table 7).

TABLE 7

Example 7 Filterability test

| | Substance to be removed | Breakthrough point (L) | Filterability (L/mL) |
|---|---|---|---|
| 1 | Free residual chlorine | 24,000 | 229 |
| 2 | Turbidity | 2,600 | 25 |
| 3 | Chloroform | 1,700 | 16 |
| 4 | Bromodichloromethane | 5,000 | 48 |
| 5 | Dibromochloromethane | 7,000 | 67 |
| 6 | Bromoform | 27,000 | 257 |
| 7 | Tetrachloroethylene | 48,000 | 458 |
| 8 | Trichloroethylene | 16,000 | 153 |
| 9 | 1,1,1-Trichloroethane | 2,900 | 28 |
| 10 | Total trihalomethanes | 2,100 | 20 |
| 11 | CAT | 24,000 | 229 |
| 12 | 2-MIB | 26,000 | 248 |

Figure 13:
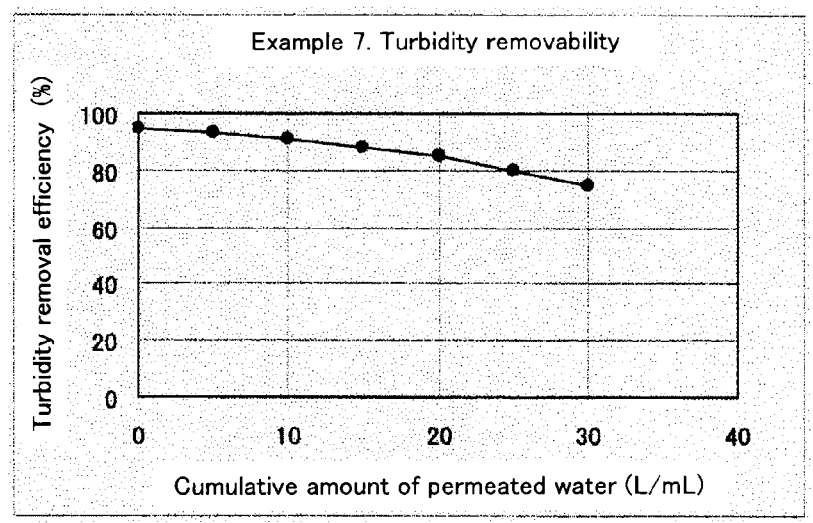
FIG. 13 is a graph showing the turbidity removability of the water purifier of Example 7.
Figure 14:
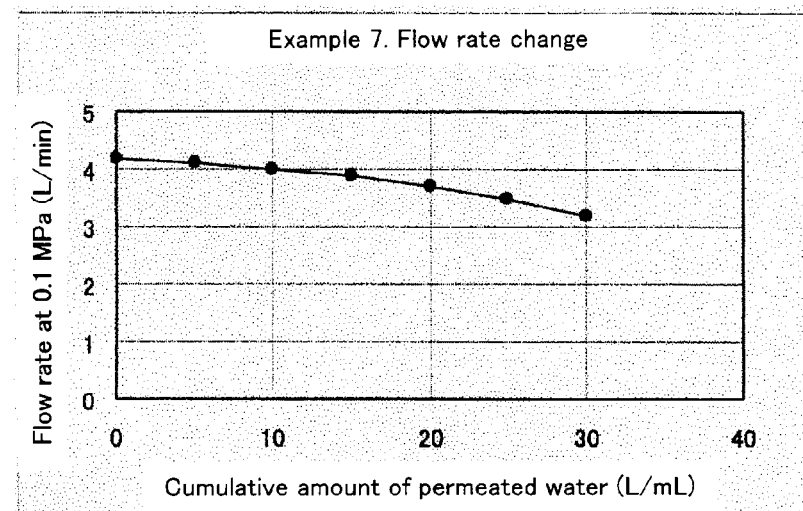
FIG. 14 is a graph showing the change in the amount of turbid water that flows through the water purifier of Example 7.

The results of measuring turbidity filterability in the same manner as in Example 1 are shown in Table 9 and FIGS. 13 and 14. Although a flow rate reduction was small as shown in FIG. 14, the turbidity removal efficiency fell below 80% at 25 L/mL, and the turbidity filterability was 25 L/mL as shown in FIG. 13.

Example 8

Slurry was prepared by dispersing in water 85 parts by weight of RP13-100MD (made from phenolic resin, median particle size of 100 μm, standard deviation σg of 1.6, benzene adsorption amount of 28 wt %) manufactured by Kuraray Chemical Co., Ltd., and 10 parts by weight of RP-13 powder (made from phenolic resin, median particle size of 20 μm, standard deviation σg of 2.4, benzene adsorption amount of 33 wt %) manufactured by Kuraray Chemical Co., Ltd., both as powdery activated carbon, and 5 parts by weight of Bi-PUL/F as a fibrous binder. The resulting slurry was suction-molded in the same manner as in Example 1, thus giving molded activated carbon in a hollow cylindrical shape. The median particle size of the mixed powdery activated carbon was 95 μm, the standard deviation σg was 1.7, and the standard deviation σp was 0.38. A filterability test for free residual chlorine, volatile organic compounds, CAT, and 2-MIB was carried out in the same manner as in Example 1, and showed excellent results (Table 8).

TABLE 8

Example 8 Filterability test

| | Substance to be removed | Breakthrough point (L) | Filterability (L/mL) |
|---|---|---|---|
| 1 | Free residual chlorine | 17,000 | 162 |
| 2 | Turbidity | 2,900 | 28 |
| 3 | Chloroform | 2,000 | 19 |
| 4 | Bromodichloromethane | 5,700 | 54 |
| 5 | Dibromochloromethane | 7,900 | 75 |
| 6 | Bromoform | 31,000 | 296 |
| 7 | Tetrachloroethylene | 39,000 | 372 |
| 8 | Trichloroethylene | 13,000 | 124 |
| 9 | 1,1,1-Trichloroethane | 2,400 | 23 |
| 10 | Total trihalomethanes | 2,400 | 23 |
| 11 | CAT | 17,000 | 162 |
| 12 | 2-MIB | 18,000 | 172 |

Figure 15:
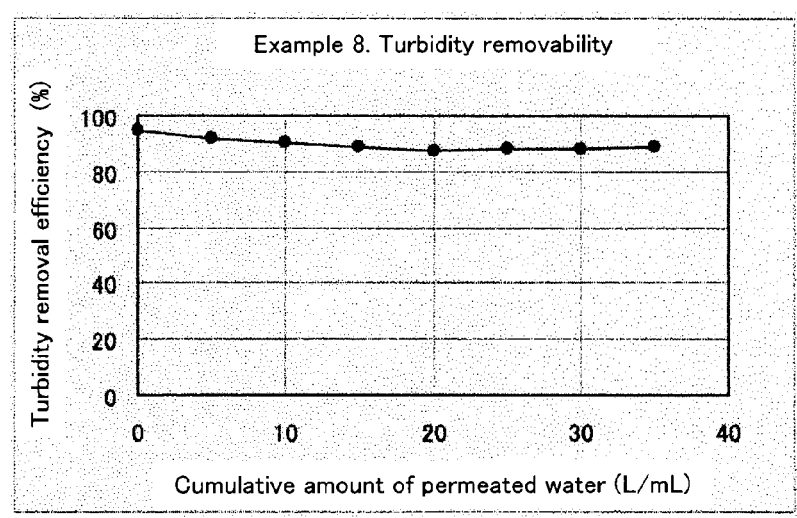
FIG. 15 is a graph showing the turbidity removability of the water purifier of Example 8.
Figure 16:
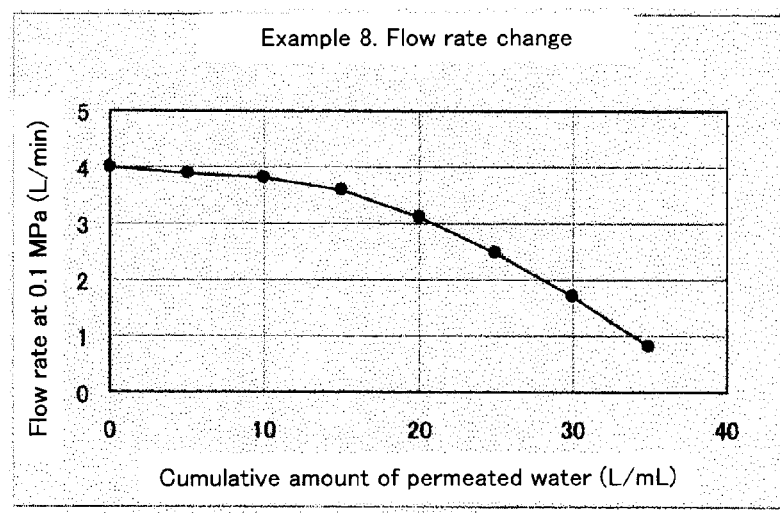
FIG. 16 is a graph showing the change in the amount of turbid water that flows through the water purifier of Example 8.

The results of measuring turbidity filterability in the same manner as in Example 1 are shown in Table 9 and FIGS. 15 and 16. As shown in FIG. 15, a turbidity removal efficiency of no less than 80% was maintained, and as shown in FIG. 16, the turbidity filterability at the point where the flow rate fell below ½ of the initial flow rate was 28 mL.

Comparative Example 1

Figure 17:
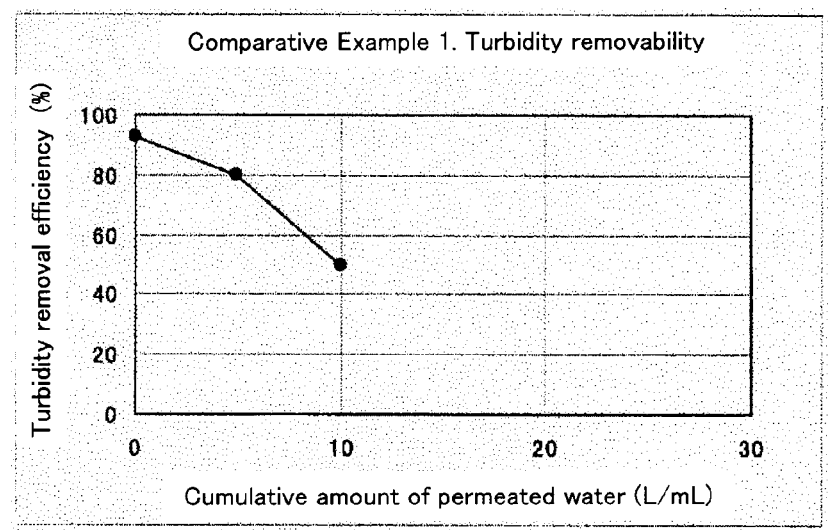
FIG. 17 is a graph showing the turbidity removability of the water purifier of Comparative Example 1.
Figure 18:
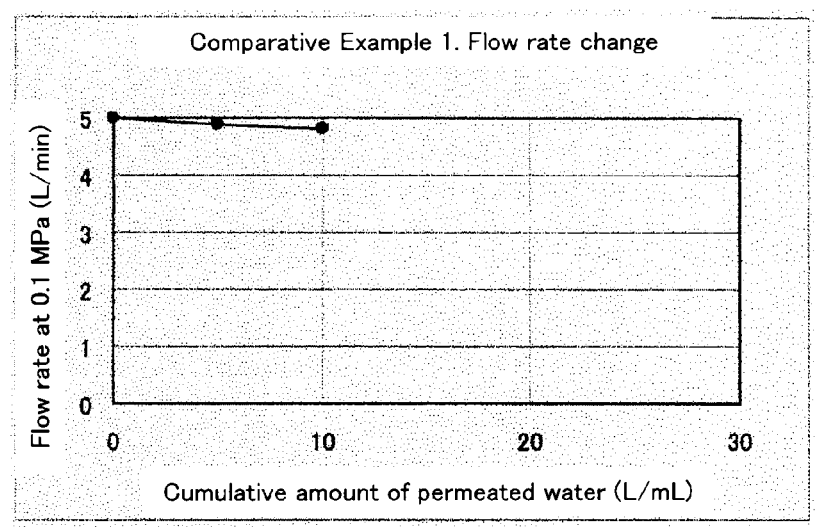
FIG. 18 is a graph showing the change in the amount of turbid water that flows through the water purifier of Comparative Example 1.

Molded activated carbon in a hollow cylindrical shape was obtained by suction molding in the same manner as in Example 1 except that GW60/150 (made from coconut shell, median particle size of 230 μm, standard deviation σg of 1.5, standard deviation σp of 0.78, benzene adsorption amount of 29 wt %) manufactured by Kuraray Chemical Co., Ltd., was used as granular activated carbon in place of PGW-100MD. The results of measuring turbidity filterability in the same manner as in Example 1 are shown in Table 9 and FIGS. 17 and 18. Although there was little flow rate reduction as shown in FIG. 18, the turbidity removal efficiency fell below 80% at 5 L/mL, and the turbidity filterability was 5 L/mL as shown in FIG. 17.

Comparative Example 2

Figure 19:
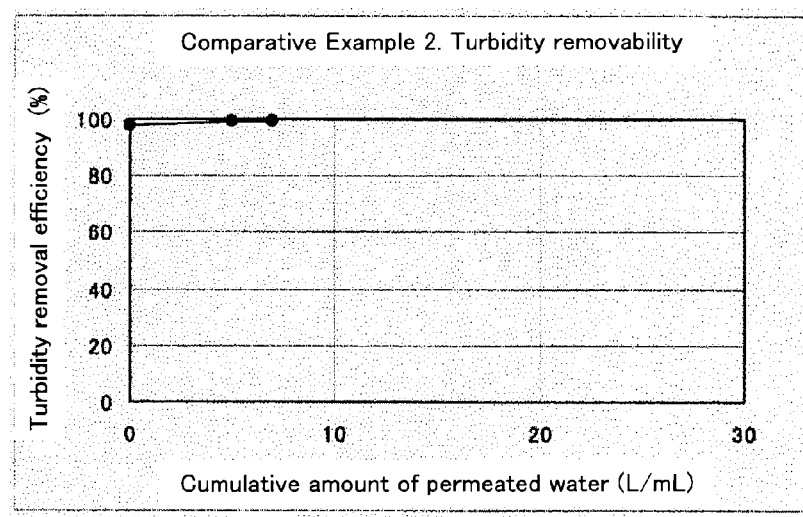
FIG. 19 is a graph showing the turbidity removability of the water purifier of Comparative Example 2.
Figure 20:
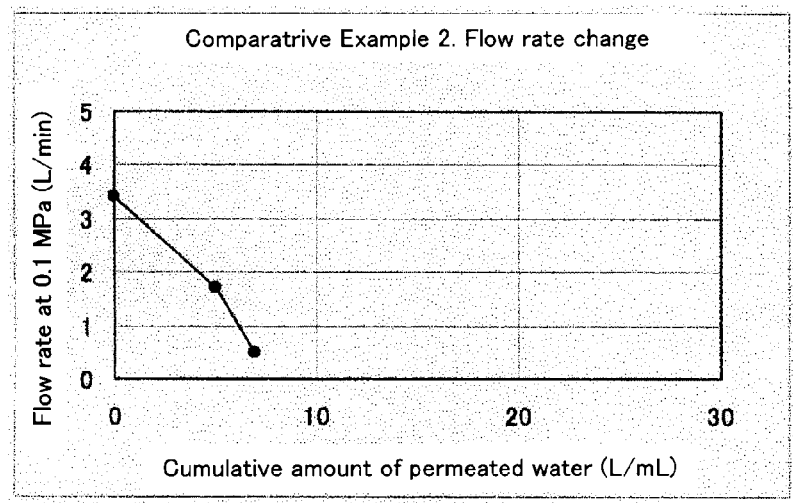
FIG. 20 is a graph showing the change in the amount of turbid water that flows through the water purifier of Comparative Example 2.

Molded activated carbon in a hollow cylindrical shape was obtained by suction molding in the same manner as in Example 1 except that PGW-50MD (made from coconut shell, median particle size of 60 μm, standard deviation σg of 1.4, standard deviation σp of 0.20, benzene adsorption amount of 33 wt %) manufactured by Kuraray Chemical Co., Ltd., was used as powdery activated carbon in place of PGW-100MD. The results of measuring turbidity filterability in the same manner as in Example 1 are shown in Table 9 and FIGS. 19 and 20. Although a turbidity removal efficiency of no less than 80% was maintained as shown in FIG. 19, the turbidity filterability at the point where the flow rate fell below ½ of the initial flow rate was 5 L/mL as shown in FIG. 20.

Comparative Example 3

Figure 21:
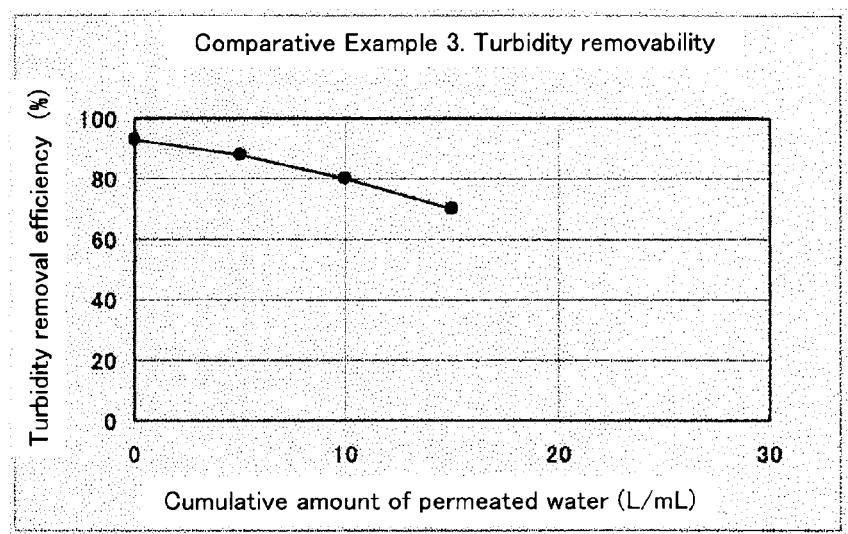
FIG. 21 is a graph showing the turbidity removability of the water purifier of Comparative Example 3.
Figure 22:
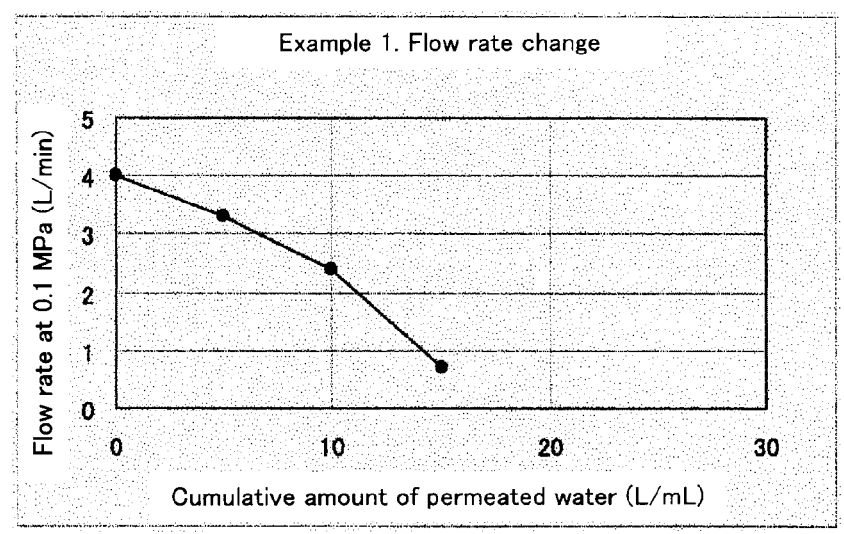
FIG. 22 is a graph showing the change in the amount of turbid water that flows through the water purifier of Comparative Example 3.

Slurry was prepared by dispersing in water 45 parts by weight of GW60/150 and 45 parts by weight of PGW-20MD (made from coconut shell, median particle size of 40 μm, standard deviation σg of 2.0, benzene adsorption amount of 33 wt %) manufactured by Kuraray Chemical Co., Ltd., both as granular activated carbon, 5 parts by weight of ATS as a lead adsorbent, and 5 parts by weight of Bi-PUL/F as a fibrous binder. The resulting slurry was suction-molded in the same manner as in Example 1, thus giving molded activated carbon in a hollow cylindrical shape. The median particle size of the mixed granular activated carbon was 120 μm, the standard deviation σg was 2.4, and the standard deviation σp was 0.23. The results of measuring turbidity filterability in the same manner as in Example 1 are shown in Table 9 and FIGS. 21 and 22. As shown in FIG. 21, the turbidity removal efficiency fell below 80% at 10 L/mL, and as shown in FIG. 22, the flow rate fell below ½ of the initial rate at 12 L/mL, and the turbidity filterability was 10 L/mL.

Comparative Example 4

Figure 23:
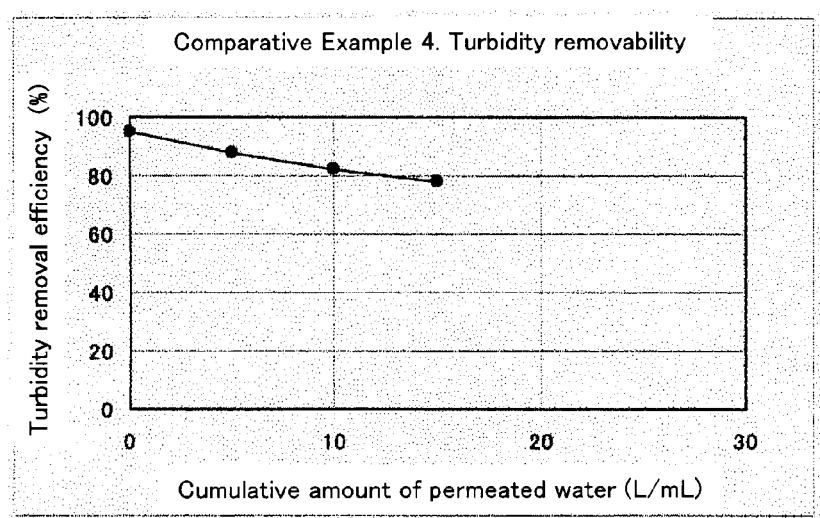
FIG. 23 is a graph showing the turbidity removability of the water purifier of Comparative Example 4.
Figure 24:
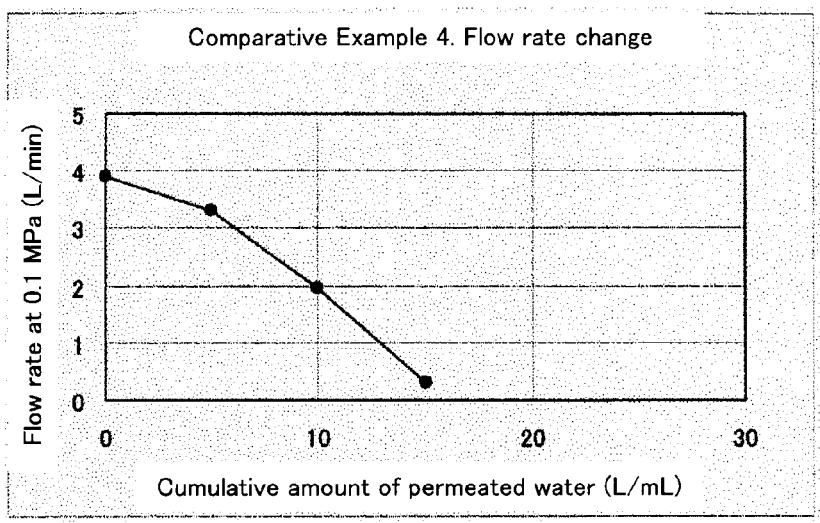
FIG. 24 is a graph showing the change in the amount of turbid water that flows through the water purifier of Comparative Example 4.

Molded activated carbon in a hollow cylindrical shape was obtained by suction molding in the same manner as in Example 1 except that PGW-100MC (made from coconut shell, median particle size of 100 μm, standard deviation σg of 1.2, standard deviation σp of 0.28, benzene adsorption amount of 33 wt %) manufactured by Kuraray Chemical Co., Ltd., was used as powdery activated carbon in place of PGW-100MD. The results of measuring turbidity filterability in the same manner as in Example 1 are shown in Table 9 and FIGS. 23 and 24. As shown in FIG. 23, the turbidity removal efficiency fell below 80% at 13 L/mL, and as shown in FIG. 24, the flow rate fell below ½ of the initial rate at 10 L/mL, and the turbidity filterability was 10 L/mL.

Comparative Example 5

Figure 25:
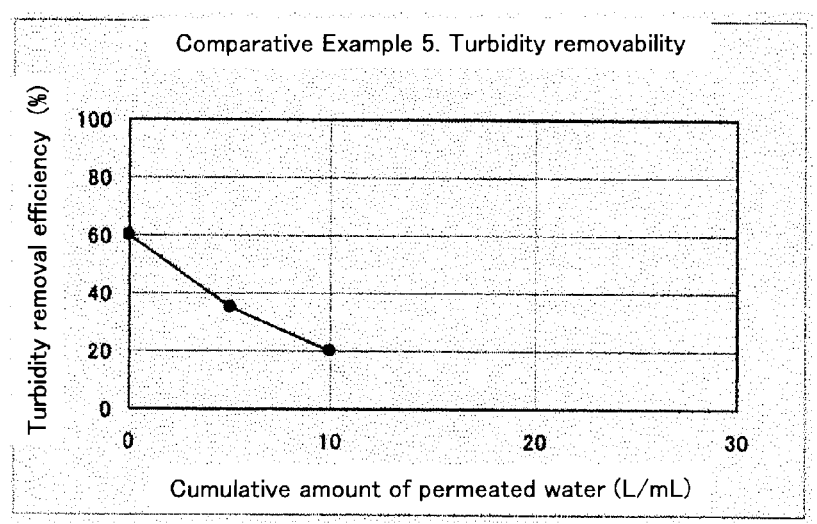
FIG. 25 is a graph showing the turbidity removability of the water purifier of Comparative Example 5.
Figure 26:
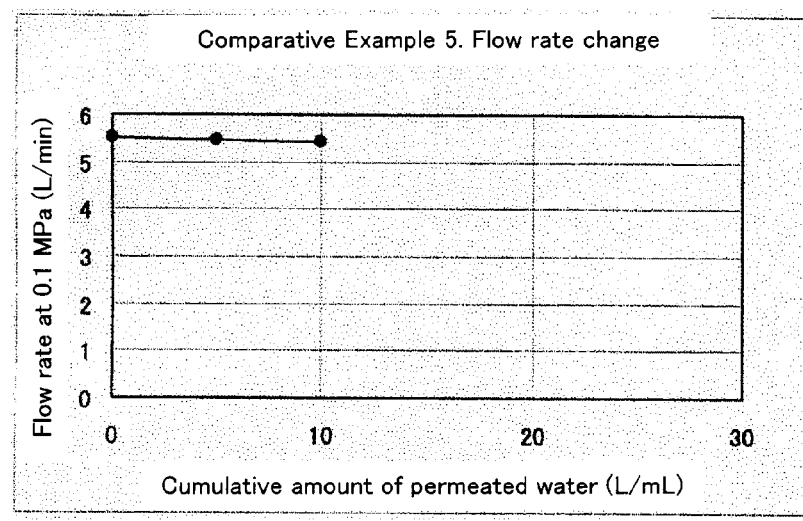
FIG. 26 is a graph showing the change in the amount of turbid water that flows through the water purifier of Comparative Example 5.

Slurry was prepared by dispersing in water 45 parts by weight of GW48/100 (made from coconut shell, median particle size of 280 μm, standard deviation σg of 1.4, benzene adsorption amount of 33 wt %) manufactured by Kuraray Chemical Co., Ltd., 45 parts by weight of PGW-20MD, both as granular activated carbon, 5 parts by weight of ATS as a lead adsorbent, and 5 parts by weight of Bi-PUL/F as a fibrous binder. The resulting slurry was suction-molded in the same manner as in Example 1, thus giving molded activated carbon in a hollow cylindrical shape. The median particle size of the mixed powdery granular activated carbon was 150 μm, the standard deviation σg was 2.5, and the standard deviation ρp was 0.20. The results of measuring turbidity filterability in the same manner as in Example 1 are shown in Table 9 and FIGS. 25 and 26. Although there was little flow rate reduction as shown in FIG. 26, the turbidity removal efficiency was below 80% from the beginning, and the turbidity filterability was 0 L/mL as shown in FIG. 25.

TABLE 9

| | Powdery activated carbon (parts by weight) | $D_{50}$ (μm) | σg | σp | Bz (wt %) | Other additive components (parts by weight) | Binder (parts by weight) | Initial flow rate (L/min) | Turbidity removal efficiency breakthrough point (L/mL) | Clogging breakthrough point (below ½ of the initial flow rate) (L/mL) |
|---|---|---|---|---|---|---|---|---|---|---|
| Example 1 | Coconut shell PGW-100MD (90) | 100 | 1.6 | 0.40 | 33 | ATS(5) | Bi-PUL/F (5) | 4.0 | >30 | 30 |
| Example 2 | Coconut shell PGW-120MP (90) | 120 | 1.7 | 0.47 | 33 | ATS(5) | Bi-PUL/F (5) | 4.2 | 16 | >16 |
| Example 3 | Coconut shell PGW-100MD (60) Coconut shell PGW-20MD (30) | 80 | 1.8 | 0.33 | 33 | ATS(5) | Bi-PUL/F (5) | 3.7 | >15 | 15 |
| Example 4 | Coconut shell PGW-100MD (87) | 100 | 1.6 | 0.40 | 33 | ATS(5) | Bi-PUL/F (8) | 4.1 | 20 | >20 |
| Example 5 | Coconut shell PGW-100MD (92) | 100 | 1.6 | 0.40 | 33 | ATS(5) | Bi-PUL/F (3) | 3.9 | >20 | 20 |
| Example 6 | Coconut shell PGWHH-120MP (95) | 120 | 1.7 | 0.48 | 50 | — | Bi-PUL/F (5) | 4.1 | 18 | >18 |
| Example 7 | Coconut shell PGW-100MD (90) | 100 | 1.6 | 0.40 | 33 | FR-15(5) | Bi-PUL/F (5) | 4.2 | 25 | >25 |
| Example 8 | Phenol RP13- | 95 | 1.7 | 0.38 | 28 | — | Bi-PUL/F | 4.0 | >28 | 28 |

TABLE 9-continued

|  | Powdery activated carbon (parts by weight) | $D_{50}$ (μm) | σg | σp | Bz (wt %) | Other additive components (parts by weight) | Binder (parts by weight) | Initial flow rate (L/min) | Turbidity removal efficiency breakthrough point (L/mL) | Clogging breakthrough point (below ½ of the initial flow rate) (L/mL) |
|---|---|---|---|---|---|---|---|---|---|---|
|  | 100MD (85) Phenol RP-13 powder (10) |  |  |  |  |  | (5) |  |  |  |
| Comparative Example 1 | Coconut shell GW60/150 (90) | 230 | 1.5 | 0.78 | 29 | ATS(5) | Bi-PUL/F (5) | 5.0 | 5 | >5 |
| Comparative Example 2 | Coconut shell PGW-50MD (90) | 60 | 1.4 | 0.20 | 33 | ATS(5) | Bi-PUL/F (5) | 3.4 | >5 | 5 |
| Comparative Example 3 | Coconut shell GW60/150 (45) Coconut shell PGW-20MD (45) | 120 | 2.4 | 0.23 | 29 | ATS(5) | Bi-PUL/F (5) | 4.0 | 10 | >10 |
| Comparative Example 4 | Coconut shell PGW-100MC (90) | 100 | 1.2 | 0.28 | 33 | ATS(5) | Bi-PUL/F (5) | 3.9 | >10 | 10 |
| Comparative Example 5 | Coconut shell GW48/100 (45) Coconut shell PGW-20MD (45) | 150 | 2.5 | 0.20 | 33 | ATS(5) | Bi-PUL/F (5) | 5.5 | 0 | >10 |

Basic physical property:
PGW-100MD D50 = 100 μm, σg = 1.6, Bz(benzene adsorption amount) = 33 wt %
PGW-120MP D50 = 120 μm, σg = 1.7, Bz = 33 wt %
PGW-20MD D50 = 40 μm, σg = 2.0, Bz = 33 wt %
PGWHH-120MP D50 = 120 μm, σg = 1.7, Bz = 50 wt %
RP13-100MD Phenolic raw materials, D50 = 100 μm, σg = 1.6, Bz = 28 wt %
RP-13 powder Phenolic raw materials, D50 = 20 μm, σg = 2.4, Bz = 28 wt %
GW60/150 D50 = 230 μm, σg = 1.5, Bz = 29 wt %
PGW-50MD D50 = 60 μm, σg = 1.4, Bz = 33 wt %
PGW-100MC D50 = 100 μm, σg = 1.2, Bz = 33 wt %
GW48/100 D50 = 280 μm, σg = 1.4, Bz = 33 wt %

INDUSTRIAL APPLICABILITY

The present invention provides molded activated carbon having excellent removability for free residual chlorine, volatile organic compounds, CAT, and 2-MIB as measured according to JIS S 3201 (2004) and excellent turbidity filterability. Therefore, a water purifier loaded with a cartridge obtained by filling a housing with the molded activated carbon of the present invention as a water purifying filter can meet safety and health demands on the quality of tap water, and is industrially useful.

The invention claimed is:

1. A molded activated carbon produced by molding a mixture comprising powdery activated carbon (a) having a median particle size of 80 μm to 120 μm, a standard deviation σg of 1.3 to 1.9 in a particle size distribution and a standard deviation σp of 0.3 to 0.5 in the particle size distribution; and a fibrous binder (b),
   the standard deviation σg being expressed as $D_{15.87}/D_{50}$, where $D_{15.87}$ is a value of a diameter at 15.87% in a volume-based cumulative fraction in a case where a volume integral is obtained from large particles of the powdery activated carbon in a volume-average particle size distribution, and $D_{50}$ is a value of a diameter at 50% in a volume-based cumulative fraction in a case where a volume integral is obtained from large particles of the powdery activated carbon in a volume-average particle size distribution, and
   the standard deviation σp is expressed as $D_{84.13}/D_{50}$, where $D_{84.13}$ is a value of a diameter at 84.13% in a volume-based cumulative fraction in a case where a volume integral is obtained from large particles of the powdery activated carbon in a volume-average particle size distribution, and $D_{50}$ is a value of a diameter at 50% in a volume-based cumulative fraction in a case where a volume integral is obtained from large particles of the powdery activated carbon in a volume-average particle size distribution.

2. The molded activated carbon of claim 1, wherein the mixture further comprises an amorphous titanosilicate-based inorganic compound or an aluminosilicate-based inorganic compound (c).

3. The molded activated carbon of claim 1, wherein the powdery activated carbon (a) has a benzene adsorption amount of 20 to 60 wt %.

4. The molded activated carbon of claim 1, wherein the mixture comprises the fibrous binder (b) in a proportion of 3 to 8 parts by weight relative to 100 parts by weight of the powdery activated carbon (a).

5. The molded activated carbon of claim 1, wherein the powdery activated carbon (a) is coconut shell-based activated carbon powder or phenolic resin-based activated carbon powder.

6. The molded activated carbon of claim 1, wherein any activated carbon contained in the molded activated carbon is entirely the powdery activated carbon (a).

7. A water purifying filter comprising the molded activated carbon of claim 1.

8. A cartridge wherein a housing is filled with the molded activated carbon of claim 1.

9. A water purifier comprising the cartridge of claim 8.

10. The water purifier of claim 9, having (i) a turbidity removal efficiency of no less than 80% and (ii) a turbidity filterability of no less than 15 L per 1 mL of molded activated carbon.

11. A cartridge wherein a housing is filled with the water purifying filter of claim 7.

12. A water purifier comprising the cartridge of claim 11.

13. The water purifier of claim 12, having (i) a turbidity removal efficiency of no less than 80% and (ii) a turbidity filterability of no less than 15 L per 1 mL of molded activated carbon.

14. The molded activated carbon of claim 1, wherein the powdery activated carbon (a) has a standard deviation σp of 0.36 to 0.45 in the particle size distribution.

15. The molded activated carbon of claim 1, wherein the powdery activated carbon (a) has a benzene adsorption amount of 25 to 40 wt %.

16. The molded activated carbon of claim 1, wherein the mixture comprises the fibrous binder (b) in a proportion of 3.5 to 6 parts by weight relative to 100 parts by weight of the powdery activated carbon (a).

17. The molded activated carbon of claim 1, wherein a fiber length of the fibrous binder is 4 mm or less.

18. The molded activated carbon of claim 1, wherein the mixture further comprises 3 to 10 parts by weight of an amorphous titanosilicate-based inorganic compound, based on 100 parts by weight of powdery activated carbon.

19. The molded activated carbon of claim 1, wherein the mixture further comprises 3 to 10 parts by weight of an aluminosilicate-based inorganic compound, based on 100 parts by weight of powdery activated carbon.

* * * * *